Jan. 22, 1924.
M. G. GIMENO
BEARING
Filed May 2, 1922    2 Sheets-Sheet 1
1,481,705
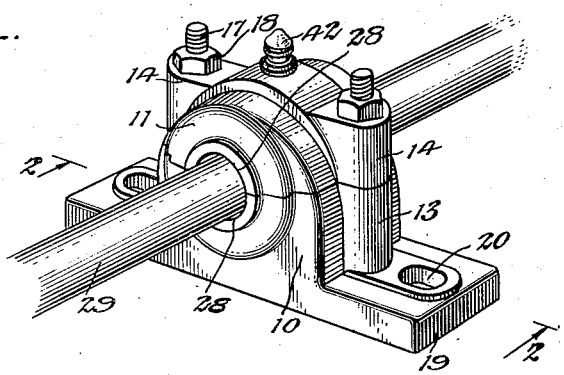
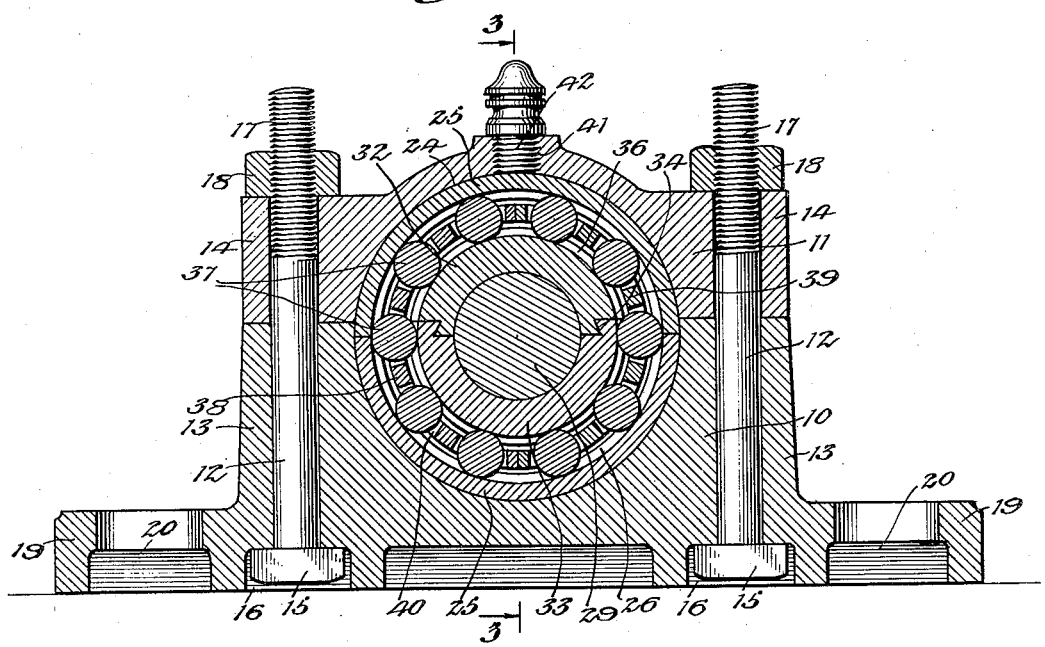
INVENTOR
Manuel G. Gimeno
BY
ATTORNEYS Jan. 22, 1924.
M. G. GIMENO
BEARING
Filed May 2, 1922
1,481,705
2 Sheets-Sheet 2
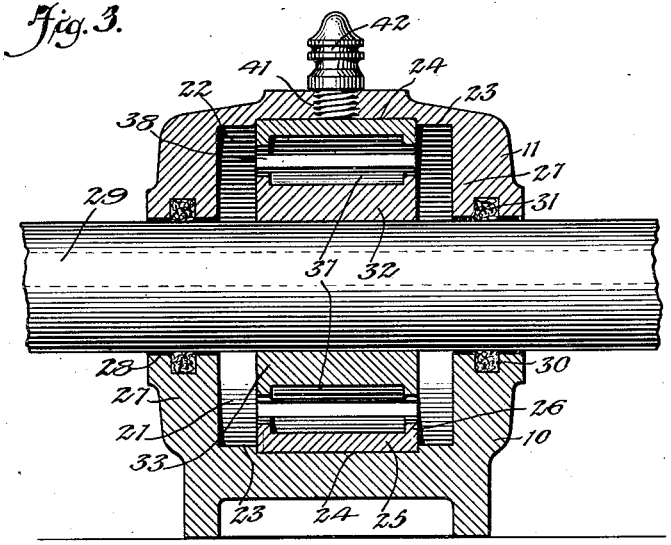
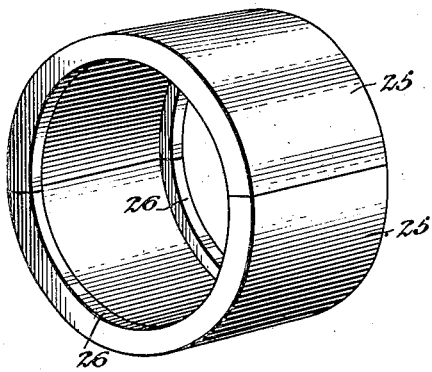
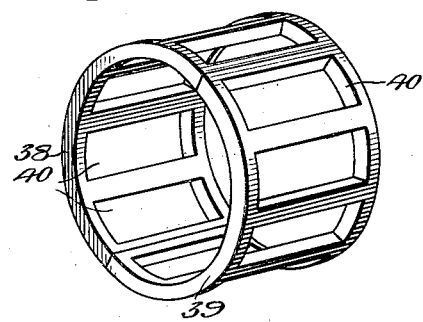
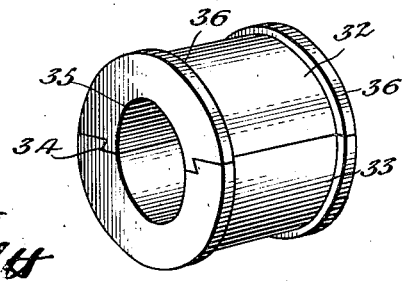
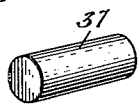
INVENTOR
Manuel G. Gimeno
BY
ATTORNEYS Patented Jan. 22, 1924.

1,481,705

UNITED STATES PATENT OFFICE.

MANUEL G. GIMENO, OF BAYONNE, NEW JERSEY.

BEARING.

Application filed May 2, 1922. Serial No. 558,020.

*To all whom it may concern:*

Be it known that I, MANUEL G. GIMENO, a subject of the King of Spain, and a resident of Bayonne, in the county of Hudson and State of New Jersey, have invented a new and Improved Bearing, of which the following is a full, clear, and exact description.

This invention has relation to bearings for shafts or axles and refers more particularly to an improved roller bearing journal box therefor.

As an object the invention contemplates a bearing or journal box in which friction is reduced to a minimum and in which means is provided for preventing wear upon the shaft or axle and the journal box or housing by interposing between said members wear elements which are designed to be renewed when worn.

As a further object the invention contemplates in a bearing or journal box, means for facilitating the expeditious assembly and disassembly of the parts thereof for the purpose of renewing or cleaning the wear elements and anti-friction elements.

As a further object the invention contemplates means for lubricating the working parts thereof without the necessity of disassembling the bearing.

As a still further object the invention aims to produce a bearing or journal box which is comparatively simple in its construction, inexpensive to manufacture and which is thoroughly reliable and highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a perspective view of a bearing or journal box constructed in accordance with the invention.

Fig. 2 is an enlarged transverse sectional view therethrough taken approximately on the line 2—2 of Fig. 1.

Fig. 3 is a longitudinal sectional view taken approximately on the line 3—3 of Fig. 2.

Fig. 4 is a perspective view of the outer wear element removed from the journal box.

Fig. 5 is a similar view of the anti-friction roller spacing element.

Fig. 6 is a similar view of the inner wear element.

Fig. 7 is a similar view of one of the anti-friction rollers.

Referring to the drawings by characters of reference, the journal box or bearing comprises a base section 10 and a removable cover section 11 which are detachably associated with each other by means of clamping bolts 12 passed through the aligned apertured bosses 13 and 14 provided respectively on the base and cover sections. The bolts 12 are preferably provided with squared or non-circular integral heads 15 which are received by similarly shaped recesses 16 in the under side of the base section. The opposite threaded extremities 17 of the bolts 12 are adapted to receive retaining and clamping nuts 18 which bear against the upper or outer end of the boss 14 of the cover section. The base section is further provided with laterally projecting flanges 19 which are slotted or apertured as at 20 to receive the securing or anchoring elements to afford means of attaching the bearing or journal box to a supporting element, not shown, which element is designed to close the recesses 16 whereby the bolts 12 are maintained against displacement from the base and whereby the threaded extremities 17 thereof constitute in effect stud bolts for the reception of the retaining nuts 18. The sections 10 and 11 are formed in their confronting faces with substantially semi-circular central concavities or recesses 21 and 22, the curved walls 23 of which are centrally grooved as at 24 for the reception of outer wear elements or bushings 25. The bushings 25 are of substantially semi-cylindrical formation and are provided with inwardly projecting annular flanges 26 at their opposite ends, the purpose of which will be hereinafter set forth. The opposite end walls 27 of the sections 10 and 11 which define, together with the curved walls 23 the concavities or recesses 21 and 22, are provided with reduced semi-circular recesses 28 defining when the sections are assembled openings concentric with the walls 23 which communicate with the recesses 21 and 22 to admit of the reception and passage of the shaft or axle 29 through the bearing or journal box. The recesses 28 are provided with grooves 30 in which packing 31 is disposed to exclude the entrance of dust, dirt or other foreign matter to the interior of the bearing and at the same time prevent the exit of the lubricating oil or grease from the bearing or journal box. An inner wear element consisting of substantially semi-cylindrical bushings or sleeves 32 and 33 is provided. The bushings 32 and 33 are interengageably associated with each other by relative axial movement through the medium of a dovetailed joint 34 and when so associated provide a central bore 35 which snugly receives the shaft 29. The bushing sections or elements 32 and 33 are provided with outer annular flanges 36 at their opposite extremities. Anti-friction rollers 37 are interposed between the outer periphery of the sleeves 32 and 33 of the inner wear element and the inner periphery of the bushings 25 of the outer wear element, said rollers being of a diameter approximately equal to the spacing of the outer periphery of the inner wear member and the inner periphery of the outer wear member. In length the rollers 37 are equal to the spacing between the flanges 26 with the outer member and the flanges 36 with the inner member whereby said rollers are confined against axial displacement. In order to provide means for circumferentially spacing the rollers 37, a split spacing sleeve consisting of a pair of substantially semi-cylindrical sections 38 and 39 is employed, which sections are each provided with radially disposed circumferentially spaced slots 40. The rollers are respectively received in the slots 40 and the spacing sleeve is interposed between the inner and outer wear elements and is maintained against axial displacement through the engagement of the opposite ends of the slots 40 with the opposite ends of the rollers. In order to afford means for lubricating the elements of the bearing, the cover section 11 is provided with a threaded feed aperture 41 which communicates with the groove 24 and is normally closed by a threaded closure plug 42 designed to be removed for the introduction of the lubricating oil or grease.

In use and operation, the clamping of the sections 10 and 11 together serves to set up a frictional engagement between the walls of the groove 24 and the outer periphery of the outer wear element whereby said wear element is held against rotation.

The bore 35 of the inner wear element is designed to frictionally engage the shaft or axle 29 to rotate therewith whereby the wear of the anti-friction rollers will at all times occur on the wear members, which members may be replaced when worn. To disassemble the bearing, the nuts 18 are removed from the threaded extremities 17 of the bolts 12 to permit of the removal or lifting of the cover section 11 away from the base 20. One section 25 of the outer wear element 12 may then be removed, the uppermost rollers 37 and one section of the spacing sleeve, the shaft may then be lifted out of the base 10 and the bushing sections or elements 32 and 33 disassociated and removed. The remaining anti-friction rollers, the other spacing sleeve section and the other section 25 of the outer wear element are then free for removal. It will be obvious that the order is reversed for assembling the bearing and it is apparent that the construction admits of the expeditious assembly or disassembly of the bearing when desired.

I claim:

1. A bearing or journal for a shaft or axle comprising a pair of separable housing sections adapted to be associated with each other, an outer wear element comprising a pair of separable semi-cylindrical sleeve sections adapted to be associated with each other and arranged within the housing, a common means for clamping the housing and wear element sections together for retaining said wear element sections positioned within the housing sections, an inner wear element comprising a pair of semi-cylindrical sections having interengageable means for locking the same on the shaft or axle for movement therewith, said locking means being engageable and disengageable by relative axial movement of the inner wear element sections, complementary annular flanges at the opposite extremities of the inner and outer wear elements, and anti-friction rollers interposed between the confronting peripheral faces of the inner and outer wear elements and retained therein against axial displacement by the complementary end flanges of said elements.

2. A bearing or journal for a shaft or axle comprising a pair of separable housing sections adapted to be associated with each other, an outer wear element comprising a pair of separable semi-cylindrical sleeve sections adapted to be associated with each other and arranged within the housing, a common means for clamping the housing and wear element sections together for retaining said wear element sections positioned within the housing sections, an inner wear element comprising a pair of semi-cylindrical sections formed respectively with axially disposed dovetailed tongue and groove portions constituting interengageable means for locking the same on the shaft or axle for movement therewith, complementary annular flanges at the opposite extremities of the inner and outer wear elements, anti-friction rollers interposed between the confronting peripheral faces of the inner and outer wear elements and retained therein against axial displacement by the complementary end flanges of said elements, and means for spacing said anti-friction members circumferentially, comprising a pair of semi-cylindrical sleeve sections having circumferentially spaced slots.

MANUEL G. GIMENO.